Aug. 20, 1935.   J. W. FORD   2,011,575
ORTHODONTIC APPLIANCE
Filed Jan. 28, 1933
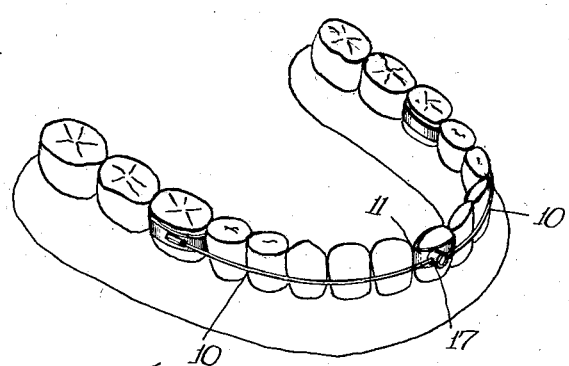
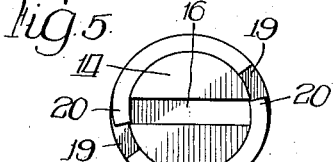
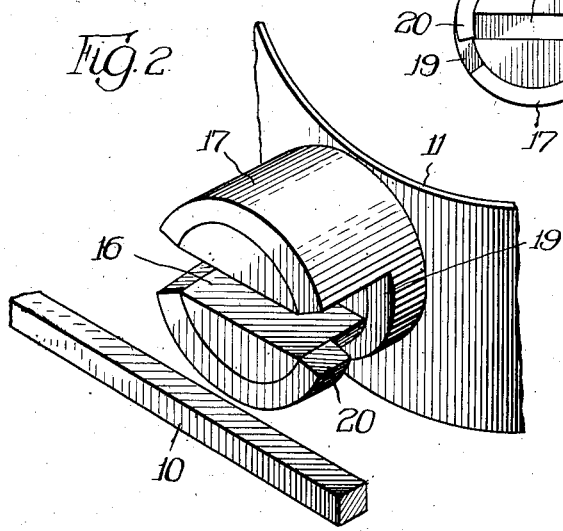
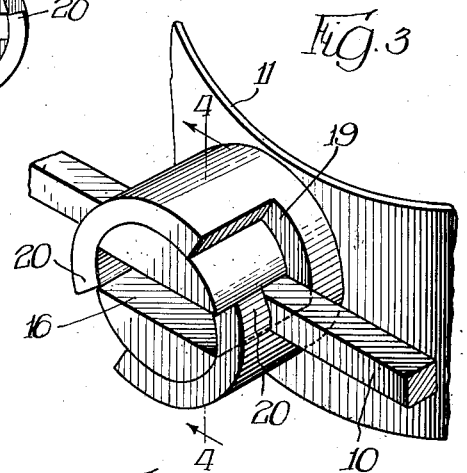
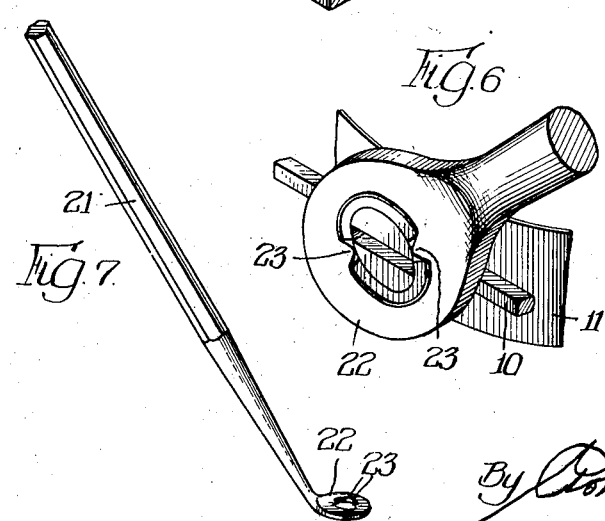
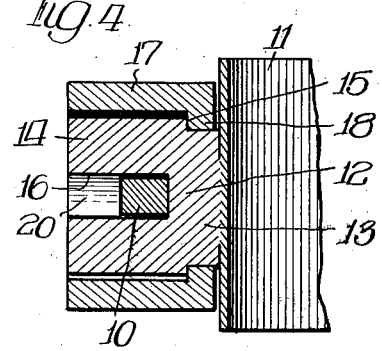
Inventor:
James W. Ford,
By [signature] attys.

Patented Aug. 20, 1935

2,011,575

UNITED STATES PATENT OFFICE 2,011,575

ORTHODONTIC APPLIANCE

James W. Ford, Chicago, Ill.

Application January 28, 1933, Serial No. 653,944

10 Claims. (Cl. 32—14)

In appliances now employed for practicing orthodontia very considerable difficulty is experienced in effecting connection between the arch-bar and the tooth bands. This is due to the limitations of the space in which the operator must work, in addition to which the relatively small size of the parts to be manipulated contributes in no small measure to the difficulty of making the required adjustments during progress of the treatment.

The present invention aims to provide an appliance which will overcome the objections noted. It affords an appliance whereby the arch-bar may be attached to and detached from a tooth band with the greatest ease compared with those appliances now available, and with the expenditure of but a minimum amount of time. Moreover, it also permits of ready accessibility to the operative parts for their manipulation, and enables the operator to effect his adjustments without discomfort or inconvenience to the patient, and also with the greatest freedom of action by the operator.

Other objects and advantages will appear as the nature of the improvements is better understood, the invention consisting substantially in the novel construction, combination and arrangement of parts hereinafter fully described, illustrated in the accompanying drawing, and finally pointed out in the appended claims.

The form of the invention herein shown and described is believed to be a preferred embodiment thereof. It will be understood, however, that the same is susceptible of changes, modifications and variations in the accomplishment of its purpose, so that the form disclosed is to be considered from an illustrative standpoint, rather than imposing limitation or restriction on the invention.

In the drawing,

Fig. 1 is a conventional perspective view illustrating the hereindescribed appliance in its application to the teeth;

Fig. 2 is a similar view, on a greatly enlarged scale, of the appliance in its open position, and the separated arch-bar ready for introduction to the appliance;

Fig. 3 is a view similar to Fig. 2, the appliance being shown in closed position, with the arch-bar introduced thereto and held thereby;

Fig. 4 is a cross-sectional view on the line 4—4, Fig. 3;

Fig. 5 is an end elevation of the appliance, showing the same in closed position as it appears in Fig. 3;

Fig. 6 is a further perspective view of the appliance having associated therewith a wrench designed particularly for application to the appliance for its manipulation, the wrench and the appliance being shown on an enlarged scale; and Fig. 7 is a perspective view of the wrench shown fragmentarily in Fig. 6.

Referring in detail to the accompanying drawing, the numeral 10 designates an arch-bar commonly employed in practicing orthodontia. In the present instance, and as clearly illustrated in Figs. 2 to 5, inclusive, the bar 10 is shown as preferably oblong in cross-section. But bars having any other cross-sectional shape may be used.

The numeral 11 designates a tooth band of the usual form and construction as employed for straightening teeth, the band 11 being intended to surround the tooth to be treated and to be applied thereto in the usual manner. To the band 11 is fixedly connected, by any suitable means, an anchoring stud 12. This stud comprises a reduced neck 13, which is immediately affixed to the band 11 in order to hold the stud 12 thereon, the stud 12 also including a head 14. The stud 12 is of cylindrical form, the reduced neck 13 providing a shoulder 15 at the inner end of the head 14.

Extending transversely of the head 14, and projecting thereinto beyond the mid-point of the length of the stud 12, is a groove 16. This groove is adapted to receive the arch-bar 10, which is introduced edgewise thereto, and said groove is substantially oblong in cross-section in order that the arch-bar 10 may fit therein and be prevented twisting or turning in the groove.

Surrounding the stud 12 is a locking sleeve 17. This sleeve is cylindrical in cross-section to correspond with the general configuration of the stud 12. The sleeve 17 is open at both ends, the opening at its inner end being of less diameter than the diameter of the opening at the outer end, and by reason of such decreased diameter at the inner end of the sleeve 17 an engaging flange 18 is formed thereat, which flange surrounds the neck 13 of the stud 12 and abuts against the shoulder 15 of the stud. This provides a swivel connection between the sleeve 17 and the stud 12 and permits free relative rotation of the sleeve 17 with respect to the stud 12, but also will prevent outward separation of the sleeve from the stud when the two are brought into assembled relation. With the stud 12 affixed to the tooth band 11 the sleeve 17 also is prevented separating from the reduced neck 13.

At diametrically opposite sides of the sleeve 17 the latter is provided with reversely-arranged bayonet slots 19, these slots opening at the outer edge of the sleeve 17, and being of a width to correspond to the width of the groove 16. The slots 19, upon proper rotation of the sleeve 17 with respect to the stud 12, will become aligned with the groove 16, as shown clearly in Fig. 2, and when the sleeve 17 is rotated about the stud 12, so as to move the slots 19 out of alignment with the groove 16, the slots 19 will be closed, as shown in Fig. 3. In the formation of the bayonet slots 19 the offset portions thereof provide closure tongues 20 which span the ends of the groove 16, when the sleeve 17 is rotated to the proper degree about the stud 12, and thus prevent the arch-bar 10 moving outwardly from the groove 16. The tongues 20 are resilient, the free ends thereof acting to spring into the ends of the groove 16 and become positioned under the opposite wall of the groove as seen in Fig. 5, thereby preventing rotation of the sleeve 17 with respect to the stud 12 until sufficient pressure is applied to the sleeve by the operator to withdraw the tongues from the ends of the groove.

Due to the exceedingly minute size of the parts which make up the hereindescribed appliance in the practical embodiment of the invention, it can be well understood by those skilled in the art that difficulty will be experienced in manipulating the operative parts when the appliance is in use. To overcome such difficulty, and permit the parts to be operated with the greatest freedom and ease, a wrench, such as illustrated in Figs. 6 and 7, is employed. This wrench includes a handle shank 21 at one end of which is arranged an angularly-disposed perforated head 22. The perforation of this head is of such diameter as readily to receive the locking sleeve 17, so as to permit the head 22 to fit thereover, as more clearly seen in Fig. 6. At opposite points at the interior of the perforated head 22 it is provided with inwardly-directed engaging projections 23. These projections 23 may be of appropriate shape adapted to fit within and be received by the open outer ends of the bayonet slots 19, and when so engaged the wrench 21 may be operated to rotate the sleeve 17 about the stud 12, and thereby cause the slots 19 to register or be moved out of alignment with the groove 16.

By the use of the hereindescribed appliance, when it is desired to connect a tooth band with the arch-bar, it being assumed that the tooth band has been applied to the tooth to be treated, the wrench 21 is applied to the sleeve 17, in the manner illustrated in Fig. 6, so that the sleeve 17 may be rotated about the stud 12 to bring the outer open ends of the bayonet slots 19 into alignment with the groove 16. Such position of the parts is shown in Fig. 2. Thereupon, the arch-bar 10 may be introduced to the groove 16 and moved to the inner end thereof so as to contact such inner end, as shown in Fig. 4. In this position the arch-bar 10 is in alignment with the offset portions of the bayonet slots 19. By applying the wrench 21 again to the sleeve 17 in the manner previously described, the engaging points 23 thus being received by the open ends of the slots 19, the operator may rotate the sleeve 17 so that the closure tongues 20 will span the ends of the groove 16, as illustrated in Fig. 3. In this position the groove 16 is closed, and the arch-bar 10 held within the same, and the locked relation of the parts thus established will remain until it is desired to readjust the relation of the arch-bar with respect to the tooth under treatment. At such time the wrench 21 again is applied to the sleeve 17, the latter then being turned in a reverse direction to the movement necessary for bringing it to its locked position, whereupon the outer open ends of the bayonet slots 19 will be brought into alignment with the groove 16, and in this position the groove 16 will be opened so as to permit the arch-bar 10 to be moved outwardly from the groove 16. In such reverse rotation of the sleeve 17, it will be apparent that the closure tongues 20 will be moved away from the arch-bar 10, thus to enable the arch-bar readily to be removed from the groove 16.

While the tooth under treatment will be held firmly to the arch-bar 10 in the manner described, there will be sufficient looseness of the anchorage to the arch-bar to permit lateral movement of the anchored tooth to close the space between itself and an adjacent tooth if such movement be necessary.

In assembling the herein described device on a tooth band, it will be understood that the stud 12 is first introduced to the sleeve 17 so that the reduced neck 13 of the stud will fit in the inner open end of the sleeve, and thereby bring the flange 18 into abutting relation with the shoulder 15 of the stud. With the stud and the sleeve so related, the reduced neck of the stud is then affixed to the tooth band in any suitable manner, the sleeve 17 remaining free to be rotated in either direction on the stud.

I claim:

1. In an appliance of the character described, the combination with a tooth band, of an anchoring device carried by said tooth band and adapted to receive an arch-bar, a locking device carried by said anchoring device, the anchoring device and the locking device being capable of relative movement with respect to each other, the locking device being swiveled to the anchoring device to prevent separation therefrom, and cooperative locking means between the anchoring device and the locking device for holding the arch-bar in the appliance.

2. In an appliance of the character described, the combination with a tooth band, of an anchoring device carried by said tooth band and adapted to receive an arch-bar, a locking sleeve surrounding said anchoring device and capable of rotation thereon, the locking device being swiveled to the anchoring device to prevent separation therefrom, the anchoring device having a groove in which said arch-bar fits, and cooperative locking means between the anchoring device and the locking sleeve for holding the arch-bar in the appliance.

3. In an appliance of the character described, the combination with a tooth band, of an anchoring device carried by said tooth band and adapted to receive an arch-bar, a locking sleeve surrounding said anchoring device and capable of rotation thereon, the anchoring device having a groove in which said arch-bar fits, and closure tongues carried by the locking sleeve and movable into overlapping relation with the groove of the anchoring device for holding the arch-bar in the appliance.

4. In an appliance of the character described, the combination with a tooth band, of an anchoring stud carried by said tooth band and provided with a transverse groove adapted to receive an arch-bar, a locking sleeve surrounding said anchoring stud, a swivel connection between said sleeve and said stud permitting free rotation of the sleeve on said stud but preventing endwise separation of the locking sleeve from said stud, and means carried by the locking sleeve and cooperating with the groove of said stud for holding the arch-bar in the appliance.

5. In an appliance of the character described, the combination with a tooth band, of an anchoring stud carried by said tooth band and provided with a transverse groove adapted to receive an arch-bar, a locking sleeve surrounding said anchoring stud and capable of rotation thereon, means for preventing separation of the locking sleeve from said stud, the locking sleeve being provided with oppositely-disposed reversely-arranged bayonet slots cooperating with the groove of said stud for holding the arch-bar in the appliance in the proper relative rotation of the sleeve with respect to said stud.

6. In an appliance of the character described, the combination with a tooth band, of an anchoring stud carried by said tooth band and provided with a transverse groove adapted to receive an arch-bar, a locking sleeve surrounding said anchoring stud, said sleeve having a flange, said stud having a shoulder with which said flange cooperates to prevent separation of the locking sleeve from said stud, and means carried by the locking sleeve and cooperating with the groove of said stud for holding the arch-bar in the appliance.

7. In an appliance of the character described, the combination with a tooth band, of an anchoring stud carried by said tooth band and provided with a transverse groove adapted to receive an arch-bar, a locking sleeve surrounding said anchoring stud, said sleeve having a flange, said stud having a reduced neck to provide a shoulder with which said flange cooperates to prevent separation of the locking sleeve from said stud, and means carried by the locking sleeve and cooperating with the groove of said stud for holding the arch-bar in the appliance.

8. In an appliance of the character described, the combination with a tooth band, of an anchoring stud carried by said tooth band and provided with a transverse groove adapted to receive an arch-bar, a locking sleeve surrounding said anchoring stud, said sleeve having a flange, said stud having a shoulder with which said flange cooperates to prevent separation of the locking sleeve from said stud, the locking sleeve being provided with oppositely-disposed reversely-arranged bayonet slots cooperating with the groove of said stud for holding the arch-bar in the appliance in the proper relative rotation of the sleeve with respect to said stud.

9. An appliance of the character described, comprising an anchoring stud, and a support therefor, the anchoring stud adjacent to said support having a reduced neck to form an annular shoulder spaced from the support, in combination with a locking device surrounding said anchoring stud and provided at its inner end with an inwardly-extending flange having engagement with the annular shoulder of the anchoring stud to hold the locking device against endwise displacement from the stud, the anchoring stud and the locking device being capable of relative rotative movement with respect to each other, and cooperative locking means between the anchoring stud and the locking device for holding an arch-bar in the appliance.

10. An appliance of the character described, comprising an anchoring stud, and a support therefor, the stud being provided with a transverse groove for receiving an arch-bar, said anchoring stud adjacent to said support also having a reduced neck to form an annular shoulder spaced from the support, in combination with a locking device surrounding said anchoring stud and provided at its inner end with an inwardly-extending flange having engagement with the annular shoulder of the anchoring stud to hold the locking device against endwise displacement from the stud, the anchoring stud and the locking device being capable of relative rotative movement with respect to each other, and cooperative locking means between the anchoring stud and the locking device for holding an arch-bar in the appliance.

JAMES W. FORD.